(12) United States Patent
Hess et al.

(10) Patent No.: US 8,585,299 B2
(45) Date of Patent: Nov. 19, 2013

(54) BEARING ARRANGEMENT WITH A SHAFT AND A NEEDLE BEARING

(75) Inventors: Stefan Hess, Erlangen (DE); Peter Solfrank, Frensdorf (DE); Patrick Ullmann, Herzogenaurach (DE); Alexander Kern, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 78 days.

(21) Appl. No.: 13/266,623

(22) PCT Filed: May 28, 2010

(86) PCT No.: PCT/EP2010/057475
§ 371 (c)(1),
(2), (4) Date: Oct. 27, 2011

(87) PCT Pub. No.: WO2011/000645
PCT Pub. Date: Jan. 6, 2011

(65) Prior Publication Data
US 2012/0045159 A1  Feb. 23, 2012

(30) Foreign Application Priority Data

Jun. 30, 2009  (DE) .................. 10 2009 031 064

(51) Int. Cl.
*F16C 33/34* (2006.01)
*F16C 33/46* (2006.01)
*F16C 19/26* (2006.01)
*F02B 75/06* (2006.01)

(52) U.S. Cl.
USPC ........... 384/565; 384/548; 384/569; 384/572; 384/418; 123/192.2

(58) Field of Classification Search
USPC ......... 384/429, 445, 457, 470, 548, 569, 572, 384/622–623, 625, 418; 123/192.2
See application file for complete search history.

(56) References Cited

U.S. PATENT DOCUMENTS 3,315,416 A * 4/1967 Healy ........................... 451/246
3,586,406 A    6/1971 Barr
3,804,478 A * 4/1974 Andree ......................... 384/615
4,174,141 A * 11/1979 Reiss ............................ 384/554

(Continued)

FOREIGN PATENT DOCUMENTS

AT         7885       10/2005
DE    3712101 A1 * 10/1988

(Continued)

*Primary Examiner* — Marcus Charles
(74) *Attorney, Agent, or Firm* — Volpe and Koenig, P.C.

(57) ABSTRACT

A bearing arrangement is provided having a shaft (1) with a bearing journal (2, 3), and a needle bearing (9) which is arranged thereon and has a cage (16) and needle rollers (11) accommodated in the latter. The bearing journal is provided with a hardened and precision-machined inner raceway (10) for the needle rollers and steps back radially in relation to axial shoulders (12, 13) of adjacent shaft sections (4, 5, 6, 7), and the axial shoulders serve as run-on surfaces for the axial end sides (14, 15) of the cage fitted between the axial shoulders. In this case, relief grooves (17, 18) are provided, with the relief grooves extending on both sides of the inner raceway and each being dimensioned in such a manner that, over the entire circumferential region of the axial shoulders, the axial distance (D) thereof from each other is significantly larger than the inner raceway width (B1) existing therebetween.

6 Claims, 1 Drawing Sheet

(56) References Cited

U.S. PATENT DOCUMENTS

| | | | |
|---|---|---|---|
| 5,857,388 A * | 1/1999 | Killion et al. | 123/192.2 |
| 6,007,254 A * | 12/1999 | Fujioka et al. | 384/572 |
| 6,305,339 B1 * | 10/2001 | Iwata et al. | 123/192.2 |
| 7,117,574 B2 * | 10/2006 | Liu et al. | 29/407.01 |
| 7,419,307 B2 * | 9/2008 | Winzeler et al. | 384/572 |
| 7,571,703 B2 | 8/2009 | Reichweger et al. | |
| 2007/0177837 A1 | 8/2007 | Tisch et al. | |
| 2009/0136169 A1 * | 5/2009 | Katayama et al. | 384/457 |
| 2009/0279822 A1 * | 11/2009 | Solfrank | 384/418 |
| 2009/0297085 A1 * | 12/2009 | Solfrank et al. | 384/571 |
| 2010/0192894 A1 | 8/2010 | Herzog et al. | |

FOREIGN PATENT DOCUMENTS

| | | |
|---|---|---|
| DE | 10 2007 027990 A1 | 12/2008 |
| DE | 102008020852 A1 * | 10/2009 |
| EP | 1 775 484 | 8/2006 |
| EP | 2017486 A1 * | 1/2009 |
| JP | 2010261507 A * | 11/2010 |
| JP | 2006 002904 A | 10/2011 |
| WO | 2007121861 | 11/2007 |

* cited by examiner

BEARING ARRANGEMENT WITH A SHAFT AND A NEEDLE BEARING

CROSS-REFERENCE TO RELATED APPLICATION

This application is a 371 of PCT/EP10/57475 which was filed May 28, 2010.

BACKGROUND

The present invention relates to a bearing arrangement comprising a shaft having a bearing journal and a needle bearing that is situated on the bearing journal and that has a cage and needle rollers accommodated therein, the bearing journal being provided with a hardened and precision-machined inner raceway for the needle rollers, the bearing journal springing back radially at least over part of its circumference relative to axial shoulders of adjacent shaft sections, and the axial shoulders acting as run-on surfaces for axial end faces of the cage fitted between the axial shoulders.

Such a bearing arrangement is known from the automotive engineering journal MTZ, 06/2008, pp. 528-524, in the form of an unbalanced shaft that is mounted by a needle bearing and that forms part of a mass balancing gearing of an internal combustion engine. High demands are made on the surface hardness and surface roughness of the inner raceway on the bearing journal that steps back radially there over its full circumference, in order to ensure an anti-friction bearing that is wear-resistant and is acoustically acceptable.

The heat input during local hardening of the shaft on the bearing journal—due as a rule to inductive heating of the bearing journal—can however cause an excessive heating of the axial shoulders immediately adjacent to the inner raceway, because the heat is inadequately conducted away due to the geometry of this bearing journal. This carries the risk of formation of stress cracks in the axial shoulders and in the adjacent shaft sections.

The present invention is based on the object of improving the construction of a bearing arrangement of the type described above with the least possible outlay in such a way that the heat treatment of the bearing journal can be carried out with reliable processing.

SUMMARY OF THE INVENTION

According to the present invention, this object is achieved in that relief grooves are provided that run on both sides of the inner raceway and that are each dimensioned such that over an entire circumferential region of the axial shoulders, their axial distance from one another is significantly greater than the width between them of the inner raceway. During the heat treatment of the bearing journal, the heat is largely conducted away via the relief grooves, so that the axial shoulders are heated to a significantly smaller extent. In this way, the above-mentioned risk of the occurrence of stress cracks is significantly reduced.

In a development of the present invention, the shaft is to be fashioned as an unbalanced shaft having a center of gravity situated eccentric to its axis of rotation, the inner raceway being essentially at a standstill relative to the unbalanced load applied to the inner raceway in a load zone, and the load zone running within the circumferential region of the axial shoulders, which is significantly less than 360° and is preferably between 170° and 190°. Therefore, differing from the prior art cited above, the axial shoulders are not fashioned around their full circumference with axial run-on surfaces that correspondingly have a circular ring shape, but rather are fashioned only locally with axial run-on surfaces in the form of circular ring segments in the region of the stationary load zone on the inner raceway. While in this constructive embodiment the cage of the needle bearing is still sufficiently axially mounted on the bearing journal, the omission of the axial shoulder sections situated diametrically opposite the load zone results in an advantageous reduction of the mass of the unbalanced shaft.

As is known from EP 1 775 484 A1, a particularly significant reduction in the mass of the unbalanced shaft can additionally be achieved if the inner raceway has a width that changes around the circumference and that, going out from the load zone, significantly tapers outside the load zone or is interrupted with a local width of zero on the circumference. A bearing journal having an interrupted inner raceway does not have a circular cross-section. Rather, possible cross-sectional shapes are based on circular cross-sections with missing circular sectors or segments, or are free shapes as disclosed for example in WO 2007/121861 A1.

In these cases, it is useful to use hones to precision-machine the inner raceway, because the geometry, differing from the pure cylindrical shape, of the inner raceway is not accessible, or is not easily accessible, for precision grinding, e.g. belt finishing. Here, the relief grooves running on both sides of the inner raceway are to be dimensioned such that not only is the excessive heat input to the axial shoulders prevented, but also the overrun of the honing tool on both sides in the axial direction, required for a uniform processing result, is provided. For the oscillation amplitude in finishing processes, a width of at least 2 mm per side is advantageous; depending on the dimensions and shape of the component, the width of the relief grooves on both sides can also be made significantly larger.

In addition, it can be provided that the width of the inner raceway between the axial shoulders is greater than the length of the needle rollers, the cage being penetrated by openings distributed around its circumference that run axially on both sides of the needle rollers. In the preferred case of an injection-molded plastic cage, these openings can be required due to the tool, while in the case of a metal cage advantages can result with regard to weight, homogenous mass distribution over the width of the cage, and improved oil mist lubrication of the needle rollers.

BRIEF DESCRIPTION OF THE DRAWINGS

Additional features and embodiments of the present invention result from the following description and from the drawings, which show an exemplary embodiment of a bearing arrangement according to the present invention.

DETAILED DESCRIPTION OF THE PREFERRED EMBODIMENTS

Figures 1, 2, 3:
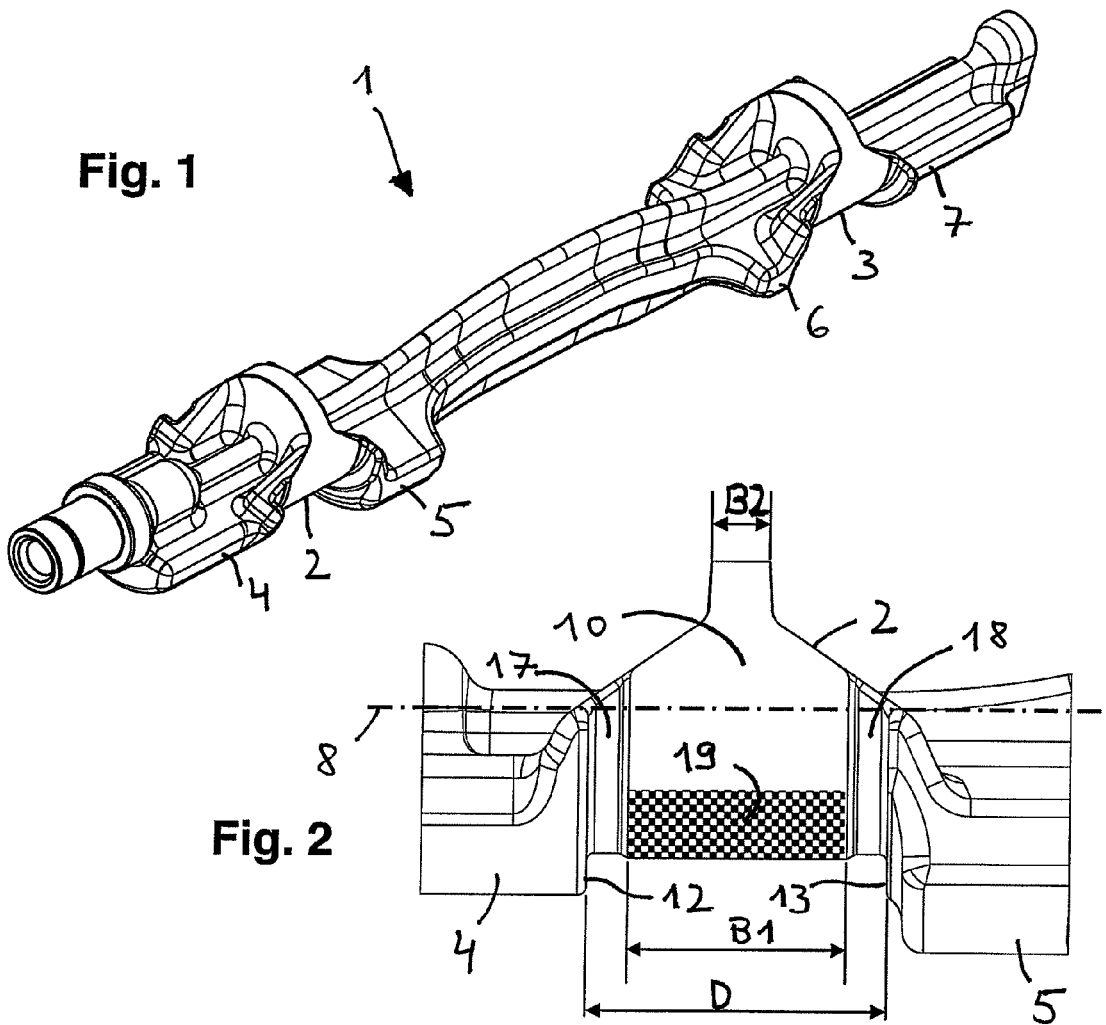
FIG. 1 shows an unbalanced shaft in a perspective representation without a needle bearing.
FIG. 2 shows one of the two bearing journals as an enlarged detail.
FIG. 3 shows the bearing journal according to FIG. 2 with the needle bearing mounted thereon.

FIG. 1 shows an unbalanced shaft 1 for a mass balancing gearing used to compensate the second-order free mass forces and moments in an internal combustion engine having a four-cylinder in-line construction. In this case, the mass balancing gearing has two such unbalanced shafts 1 that rotate in directions opposite to one another with twice the rotational speed of the crankshaft. In order to simplify the representation, components required to the drive unbalanced shaft 1, such as a chain wheel or toothed wheel, have been omitted.

The forged unbalanced shaft 1 has two bearing journals 2 and 3 having circular cross-sections that are inductively hardened and on which the unbalanced shaft 1 in the internal combustion engine is radially supported by roller bearings. The shaft sections 4 through 7 adjoining the bearing journals 2, 3 at each side are fashioned as unhardened unbalanced sections, so that the unbalanced shaft 1 has a center of gravity that is eccentric to its axis of rotation 8 (see FIG. 2) and that produces the imbalance.

FIGS. 2 and 3 show the bearing journal 2 in an enlarged view, with or, respectively, without the needle bearing 9 mounted thereon; the following description holds in the same manner for the bearing journal 3. The bearing journal 2 is provided with a precision-machined, and here honed, inner raceway 10 for the needle rollers 11, and steps back radially over a partial circumference of approximately 180° relative to the axial shoulders 12 and 13 of adjoining shaft sections 4, 5. The axial shoulders 12, 13 act as axial run-on surfaces, having the shape of circular segments, for axial end faces 14 and 15 of a cage 16 of the needle bearing 9, fitted between the axial shoulders 12, 13 with a small amount of axial play. Relief grooves 17 and 18 running on both sides of the inner raceway 10 are dimensioned, with regard to their width, in such a way that over the entire circumferential area of the axial shoulders 12, 13 their axial distance D from one another is significantly greater than width B1 between them of the inner raceway 10.

This constructive design of the bearing journal 2 has on the one hand the effect that when there is inductive heating of the inner raceway 10 there is a sufficient conducting away of heat via the relief grooves 17, 18, and the axial shoulders 12, 13 are thermally protected so as to promote significantly improved stability against formation of cracks due to stress. On the other hand, the relief grooves 17, 18, which here are made approximately 3 mm wide, enable a sufficient overrun for the honing tool, which will pass over axially in the end positions, for the precision machining of the inner raceway 10.

As FIG. 2 also illustrates, during rotation of the unbalanced shaft 1, the inner raceway 10 is loaded with a co-rotating unbalanced load, so that a load zone 19 is formed on the inner raceway 10 that is stationary apart from dynamic effects; i.e., is stationary relative to the rotating inner raceway 10, as is symbolized by the surface segment shown in dotted lines. The load zone 19 runs within the 180° partial circumference of the axial shoulders 12, 13, symmetrically thereto. The low loading of the inner raceway 10 outside the load zone 19 makes it possible to construct the inner raceway 10 with a width that changes along the circumference, such that going out from the load zone 19, the inner raceway 10 is significantly tapered outside of the load zone 19, with a width B2.

The needle bearing 9, shown mounted on the bearing journal 2 in FIG. 3, is realized such that in the region of the load zone 19 width B1 of the inner raceway 10 is greater than length L of the needle rollers 11, while this relationship is reversed with regard to width B2. In order to achieve a mass distribution that is as homogenous as possible, an improved oil mist lubrication of the needle rollers 11, and a savings in weight, a plastic cage 16, which is longitudinally slotted and is clipped onto the bearing journal 2, is penetrated by two rows of openings 20 that run axially on both sides of the needle rollers 11.

LIST OF REFERENCE CHARACTERS 1 unbalanced shaft
2 bearing journal
3 bearing journal
4 shaft section
5 shaft section
6 shaft section
7 shaft section
8 axis of rotation
9 needle bearing
10 inner raceway
11 needle roller
12 axial shoulder
13 axial shoulder
14 axial end surface
15 axial end surface
16 cage
17 relief groove
18 relief groove
19 load zone
20 opening
D axial spacing of the axial shoulders
B1 width of the inner raceway between the axial shoulders
B2 width of the inner raceway in the region of the taper
L length of the needle rollers

The invention claimed is:

1. A bearing arrangement comprising a shaft having a bearing journal integral with the shaft and having a needle bearing that is situated on the bearing journal and having a cage and needle rollers accommodated therein, the bearing journal is a hardened and precision-machined inner raceway for the needle rollers that is offset radially inwardly at least over part of a circumference thereof relative to axial shoulders of adjacent shaft sections of the shaft, the axial shoulders acting as run-on surfaces for axial end faces of the cage fitted between the axial shoulders, wherein relief grooves are provided that extend on both sides of the inner raceway and are each dimensioned such that over an entire circumferential region of the axial shoulders their axial distance from one another is significantly greater than a width, situated between the relief grooves of the inner raceway.

2. The bearing arrangement as recited in claim 1, wherein the shaft is an unbalanced shaft having a center of gravity that is eccentric to an axis of rotation, the inner raceway being essentially stationary relative to an unbalanced load that loads the inner raceway in a load zone, and the load zone extends within a circumferential region, which is significantly less than 360°, of the axial shoulders.

3. The bearing arrangement as recited in claim 2, wherein the circumferential region of the axial shoulders is greater than 170° and less than 190°.

4. The bearing arrangement as recited in claim 2, wherein the inner raceway has a width that changes over a portion of a circumference of the inner raceway, and that, extending out from the load zone, the width tapers axially inwardly toward a center of the inner raceway outside the load zone or is interrupted.

5. The bearing arrangement as recited in claim 1, wherein the inner raceway is precision-machined by honing.

6. The bearing arrangement as recited in claim 1, wherein the width of the inner raceway between the axial shoulders is greater than a length of the needle rollers, the cage being penetrated by openings that are distributed around a circumference thereof and that extend axially on both sides of the needle rollers.

* * * * *